United States Patent [19]
Hawkey et al.

[11] Patent Number: 5,353,656
[45] Date of Patent: Oct. 11, 1994

[54] ELECTROSTATICALLY CONTROLLED MICROMECHANICAL GYROSCOPE

[75] Inventors: Timothy Hawkey, Salt Lake City, Utah; Richard Torti, Burlington, Mass.; Bruce Johnson, Monument, Colo.

[73] Assignee: SatCon Technology Corporation, Cambridge, Mass.

[21] Appl. No.: 931,836

[22] Filed: Aug. 18, 1992

[51] Int. Cl.$^5$ .............................. G01C 19/24
[52] U.S. Cl. ...................... 74/5.41; 74/5.6 D; 74/5.7
[58] Field of Search ............ 74/5.6 D, 5.7, 5.41; 73/505; 310/309

[56] References Cited

U.S. PATENT DOCUMENTS

| | | | |
|---|---|---|---|
| 3,379,070 | 4/1968 | Spiegel | 74/5.6 D |
| 3,482,455 | 12/1969 | Boltinghouse et al. | 74/5.6 D |
| 3,566,700 | 3/1971 | Staats | 74/5.6 D |
| 3,642,334 | 2/1972 | Atkinson | 73/505 X |
| 3,847,026 | 11/1974 | Boltinghouse et al. | 74/5.6 D |
| 3,954,024 | 5/1976 | Staats | 74/5.41 |
| 4,061,043 | 12/1977 | Stiles | 310/309 X |
| 4,074,580 | 2/1978 | Boltinghouse et al. | 74/5.6 D |
| 4,943,750 | 7/1990 | Howe et al. | 310/42 X |
| 5,015,906 | 5/1991 | Cho et al. | 310/309 |
| 5,016,072 | 5/1991 | Greiff | 73/505 X |
| 5,043,043 | 8/1991 | Howe et al. | 310/309 |
| 5,111,693 | 5/1992 | Greiff | 73/505 X |
| 5,187,399 | 2/1993 | Carr et al. | 310/309 X |

*Primary Examiner*—Rodney H. Bonck
*Attorney, Agent, or Firm*—Joseph S. Iandiorio

[57] ABSTRACT

An integrated electrostatically-controlled micromechanical gyroscope with a rotor encompassed within a rotor cavity and electrostatically spun within the cavity. The gyroscope includes a plurality of axial electrostatic rotor actuators above and below the rotor for controlling the axial and tilt position of the rotor within the cavity, and a plurality of radial electrostatic actuators spaced circumferentially around the rotor for controlling the radial and tilt position of the rotor within the cavity. The position of the rotor within the cavity is then resolved to determine the external forces acting on the rotor.

19 Claims, 4 Drawing Sheets

ELECTROSTATICALLY CONTROLLED MICROMECHANICAL GYROSCOPE

GOVERNMENT RIGHTS

This invention was made with Government support under Contract NAS1-19282 awarded by NASA. The Government has certain rights in this invention.

FIELD OF INVENTION

This invention relates to an electrostatically-controlled micromechanical gyroscope that is fabricated on a silicon chip to make an extremely small, low power gyroscope.

BACKGROUND OF INVENTION

Mechanical gyroscopes with a spinning rotor or flywheel are used in many autonomous vehicles such as airplanes, satellites, and missiles. Because in most of these applications space is at a premium, it is desirable to have gyroscopes as small as possible, while retaining sufficient accuracy for the application. In addition, particularly for space vehicles, weight is a major concern.

Gyroscopes for these applications typically employ a rotated disc or sphere that rotates on mechanical or hydrodynamic bearings. The required number of parts and tolerances between the parts dictates the smallest possible size that can be attained using machining fabrication processes. The motor used to spin the rotor, and the sensors and actuators used to control the position of the rotor, then must be made commensurate in size with the rotor; the motor must be large enough to develop the torque necessary to control the mass of the rotor.

The rotor rotational rate of these gyros is typically on the order of only 50,000 rpm in order to limit the kinetic energy so that the rotors can be properly contained, and minimize problems associated with catastrophic rotor failure. However, it is desirable to spin the gyroscope rotors at the highest possible rate because the accuracy of the gyroscope is related to the rotor rotational velocity. In addition, the relatively large rotor mass creates a relatively high demand for power in these gyroscopes, both to spin the rotor and control its position. Accordingly, there is a great need for a much smaller gyroscope having very high rotor rotational speed and decreased power demand.

There are other applications for gyroscopes, such as in guided automobiles, that do not place such a premium on gyroscope size, weight, or power demands, although these are always concerns. However, to make the use of gyroscopes practical for such devices, there cost must be minimal. The present day machined gyroscopes require at least some manual machining steps, cleaning and assembly. Accordingly, gyroscopes to date have been essentially custom produced devices that are extremely expensive and so not practical for myriad desired uses.

SUMMARY OF INVENTION

It is therefore an object of this invention to provide an electrostatically-controlled micromechanical gyroscope that is extremely small.

It is a further object of this invention to provide such a gyroscope that is extremely light weight.

It is a further object of this invention to provide such a gyroscope which is extremely inexpensive to manufacture.

It is a further object of this invention to provide such a gyroscope which may be manufactured by mass production techniques.

It is a further object of this invention to provide such a gyroscope which does not require mechanical or hydrodynamic bearings.

It is a further object of this invention to provide such a gyroscope which has extremely high rotor spin rate.

It is a further object of this invention to provide such a gyroscope which has a high accuracy to rotor mass ratio.

This invention results from the realization that an extremely minute gyroscope can be fabricated in a monolithic silicon chip using an electrostatic spin motor and electrostatic rotor-positioning actuators that act with very little power but accomplish extremely high rotor rotational rates.

This invention may be accomplished in an electrostatically-controlled micromechanical gyroscope that is preferably an integrated design. The gyroscope includes a rotor and a rotor cavity encompassing the rotor along with means for electrostatically spinning the rotor within the cavity. Further included are a plurality of axial electrostatic rotor actuators above and below the rotor for controlling the axial and tilt position of the rotor within the cavity, and a plurality of radial electrostatic actuators spaced circumferentially around the rotor for controlling the radial and tilt position of the rotor within the rotor cavity. Further included are means for resolving the position of the rotor within the cavity to determine the external forces acting on the rotor.

In one embodiment, the rotor is disc shaped. The means for electrostatically spinning the rotor may include an electrostatic motor which may be synchronous. The motor may include a rotor member in the rotor and a stator member surrounding the rotor around the periphery of the cavity.

The gyroscope may include four axial electrostatic rotor actuators below the rotor and four above the rotor. There may be a plurality of radial electrostatic actuators spaced around the periphery of the cavity at two axially-spaced locations. Preferably there are four spaced radial actuators at each of those two locations.

The means for resolving the position of the rotor within the cavity may be responsive to both the axial and the radial actuators. The means for resolving the position of the rotor may include means for determining the rotor position in six degrees of freedom relative to the rotor cavity.

There is preferably further included some means for controlling the position of the rotor within the cavity. This may be accomplished by a means which is responsive to the axial and radial actuators, which may itself be accomplished by including means for selectively applying electrostatic rotor positioning signals to the axial and radial actuators. The rotor is preferably controlled by altering its position in six degrees of freedom in relation to the cavity. The position of the rotor within the cavity may be resolved with a plurality of capacitive sensor means spaced around the rotor cavity.

DISCLOSURE OF PREFERRED EMBODIMENTS

Other objects, features and advantages will occur to those skilled in the art from the following description of a preferred embodiment and the accompanying drawings in which.

Figure 1:
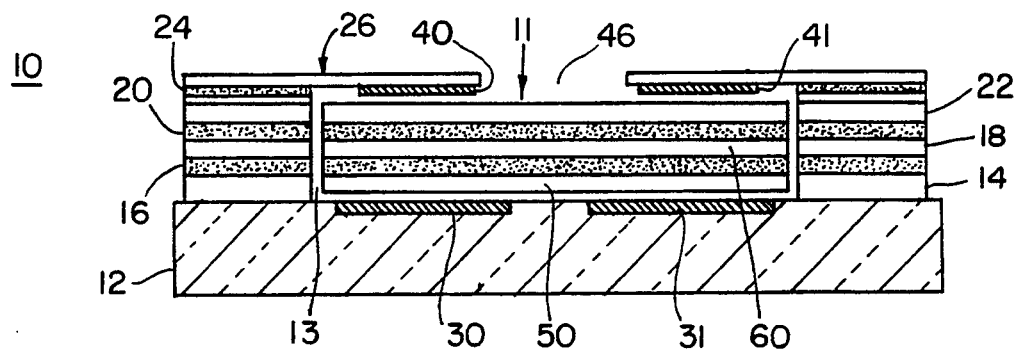
FIG. 1 is a cross sectional schematic view of an electrostatically-controlled micromechanical gyroscope according to this invention.

There is shown in FIG. 1 electrostatically-controlled micromechanical gyroscope 10 according to this invention. Gyroscope 10 is fabricated using known semiconductor chip fabrication techniques on silicon chip 12.

Gyroscope 10 includes disc-shaped rotor member 11 for rotating within a cavity, and spaced from the inner cavity walls by gap 13. At the bottom of rotor 11 in silicon chip 12 are fabricated a number of rotor axial and tilt position sensing and positioning electrodes such as electrodes 30 and 31 shown in cross section. Layer 14 is then deposited on substrate 12 and includes a number of circumferentially spaced rotor radial and tilt positioning and sensing electrodes as is further described below in conjunction with FIG. 2. Layer 22 is identical with layer 14 to accomplish proper radial and tilt positioning and sensing. Layers 16 and 20 are insulating layers that separate layer 18 from layers 14 and 22. Layer 18 includes the electrostatic synchronous motor that rotates rotor 11 within the cavity. The motor is shown in more detail in FIG. 4. Top layer 26 includes insulating portions 24 to insulate layer 26 from layer 22. Layer 26 is annular in shape as shown in FIG. 3, and is fabricated so that a portion of the layer overhangs rotor 11 to encompass rotor 11 within the gyroscope and also to serve to hold the axial and tilt position and sensing electrodes of layer 26 in place above rotor 11. Gyroscope 10 is preferably approximately 10 microns high and 250 microns wide, with rotor 11 being approximately 7 microns high and 200 microns in diameter.

Figure 2:
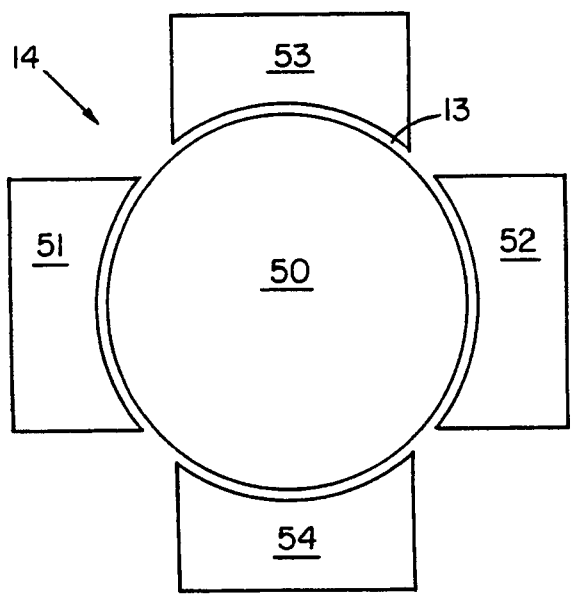
FIG. 2 is a top plan view of one of the radial actuator layers of the gyroscope of FIG. 1.
Figure 3:
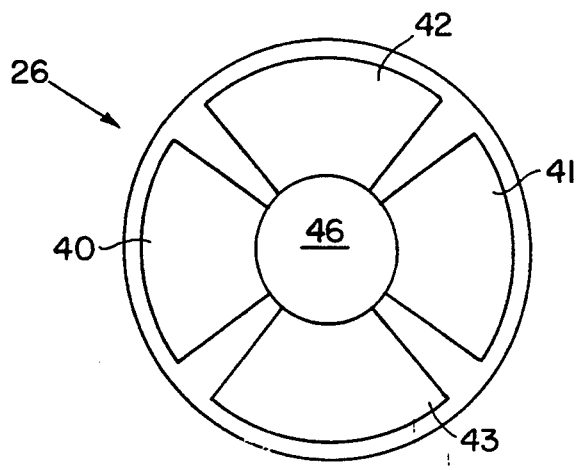
FIG. 3 is a top view of one of the axial actuator layers of the gyroscope of FIG. 1.

Rotor radial and tilt positioning and sensing layer 14 is shown in more detail in FIG. 2. Layer 14 includes central circular section 50 forming the bottom portion of rotor 11 and spaced by gap 13 from sector shaped electrodes 51 through 54 spaced circumferentially around portion 50. Layer 22, FIG. 1, is preferably identical to layer 14, FIG. 2. Together, these two layers have eight electrodes that are used both to sense the position of rotor 11 in relation to the electrodes, and hence in relation to the rotor cavity, and also to control the rotor radial and tilt position within the cavity. Gyroscope 10 is a rebalance type gyroscope in which the electronics are configured to maintain rotor 11 at its null position. The rotor positioning signals are then used to derive the external forces that have acted upon rotor 11 as described in more detail below in conjunction with FIG. 5.

FIG. 3 details top layer 26 having four sector shaped electrodes 40 through 43 spaced equally circumferentially around central opening 46. The lowermost level of electrodes including electrodes 30 and 31, FIG. 1, have an identical electrode configuration to that of layer 26, FIG. 3, so that there are in total eight such electrodes, four below and four above rotor 11, for sensing and controlling the axial and tilt position of rotor 11. Accordingly, gyroscope 10 includes a total of sixteen sense and control electrodes for sensing and controlling the position of rotor 11 in all six degrees of freedom. Alternatively, some or all of the sense functions could be decoupled from the control functions by including more electrodes. Additionally, the number and configuration of the electrodes may be altered, all as known in the art, to accomplish a gyroscope with the desired degrees of freedom.

Figure 4:
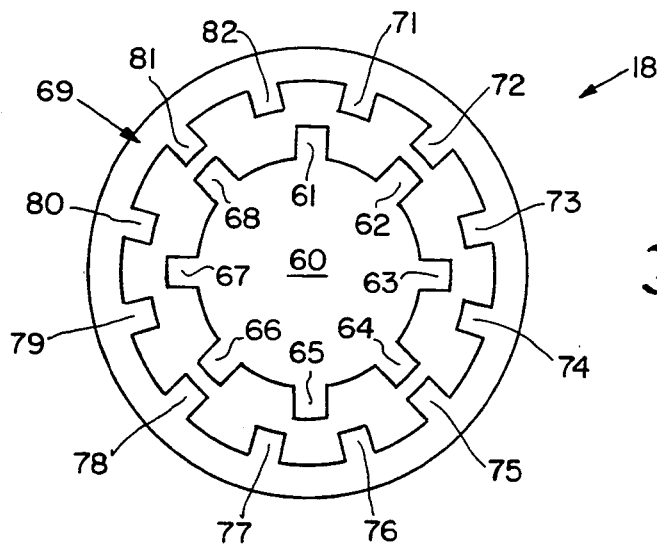
FIG 4 is a top view of the rotor rotational motor of the gyroscope of FIG. 1.

Motor layer 18, FIG. 4, includes central section 60 carried as part of rotor 11 and outer annular section 69 forming part of the rotor cavity. Inner section 60 has motor poles 61 through 68, and outer section 69 has pole 71 through 82, to accomplish a synchronous electrostatic motor driven by three phase power as is known in the art. Because the motor is synchronous, the motor drive electronics, not shown, require a variable-frequency drive source. Motor start up requires that the excitation frequency start at the sub-hertz level and ramp up to the full speed value of 25 kilohertz. This is accomplished with a ramp generator and voltage to frequency converter. The bipolar three-phase generator takes the single-phase output of the voltage to frequency converter and produces three square waves with 120° phase difference and their complementary signals for driving the output stages.

Figure 5:
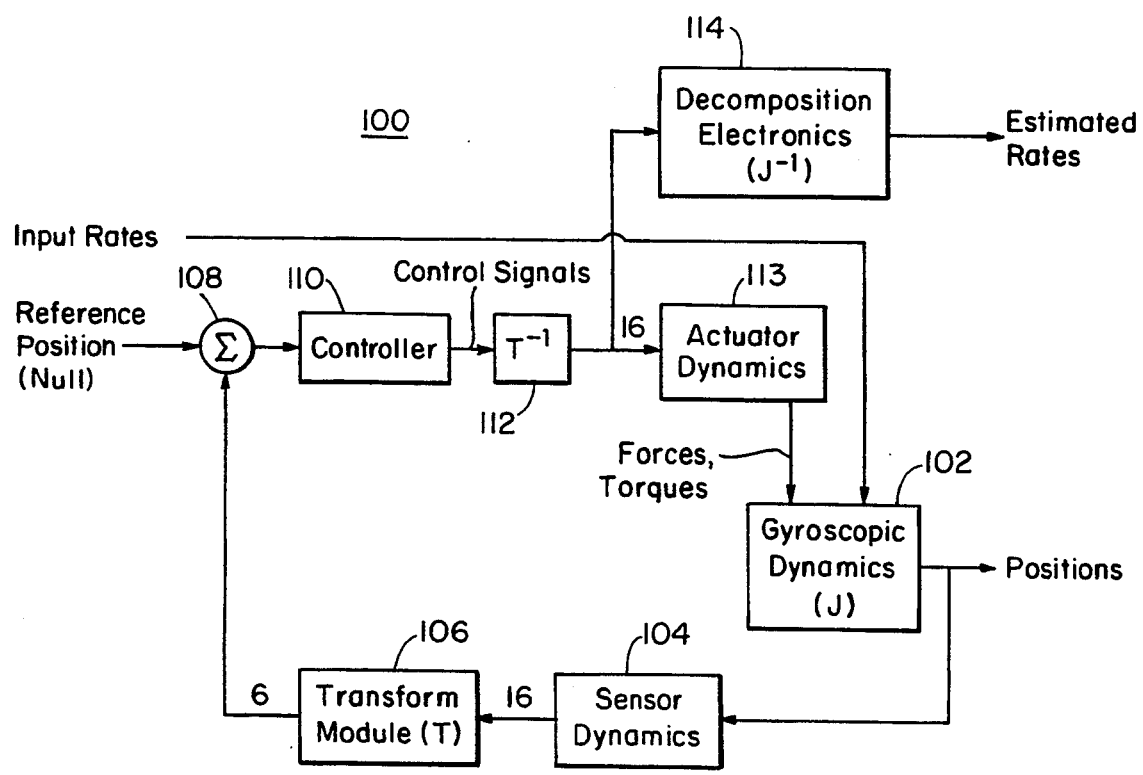
FIG. 5 is a schematic block diagram of the control system for the gyroscope of FIG. 1.

A schematic block diagram of the control and readout electronics for gyroscope 10 is shown as system 100, FIG. 5. The gyroscope is modeled by dynamics 102, implementing transformation matrix J. The sixteen electrodes 104 sense the position of the rotor within the cavity. The sixteen sensor signals are then transformed to six signals representing the six degrees of freedom by transform module 106 implementing transformation matrix T. These six signals are then compared to six null position reference signals 108, and the comparison signals are provided to controller 110 that implements the control algorithm. The output of controller 110 is then fed through a second transform module 112 that implements transform matrix $T^{-1}$, which is the inverse of matrix T used to transform the sixteen sensor signals to the six position signals. These sixteen control signals are then applied to the sixteen sense/actuator electrodes 113 to return the rotor to its null position. These same control signals are also used to determine the external influence (input rates) on the rotor using decomposition electronics 114 that implements a transform matrix $J^{-1}$ that is the inverse of the gyroscope dynamics transform matrix J. The sixteen actuator control signals are preferably implemented as relatively low frequency (approximately 200 hertz) signals. This allows the same electrodes to be used for position sensing as well as rotor movement through the use of high frequency (10 to 100 kilohertz) signals for the sense function.

Figure 6:
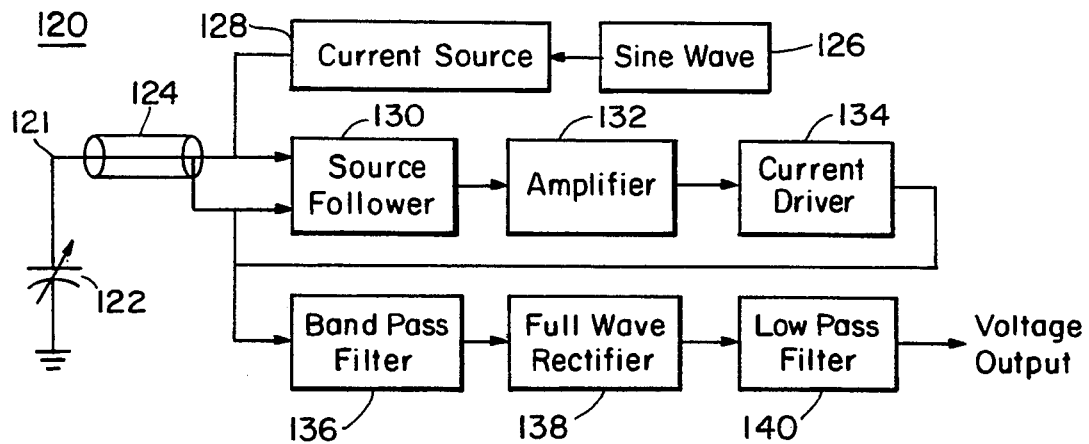
FIG. 6 is a block diagram of the rotor position sensing system for the gyroscope of FIG. 1.

Sensor electronics 120 are shown schematically in FIG. 6. Gap 13 between any one of the electrodes and the rotor may be modeled by variable capacitance 122; the capacitance varies inversely with the distance from the sensor to the rotor. The effects of stray capacitance on sensor lead 121 are greatly reduced by driving shield 124 of cable 121 with a guard loop having a voltage identical to that across the sensor so that no current flow is possible. The AC voltage produced across gap 122 is provided by a constant current source driven by sine wave generator 126 operating at 100 kilohertz. The voltage developed across gap 122 is thus directly proportional to the gap distance. Source follower 130, amplifier 132, current driver 134, band pass filter 136, full wave rectifier 138, and low pass filter 140 sense that voltage at the 100 kilohertz sensor signal drive frequency and demodulate the voltage to get a voltage signal sensor output that is proportional to the distance between the rotor and the sensor comprising part of the rotor cavity. The sixteen voltage output signals from the sixteen sensors are then used in the control and sense electronics 100, FIG. 5, to return the rotor to its null position, and also to estimate the external influence on the rotor.

Figure 7A:
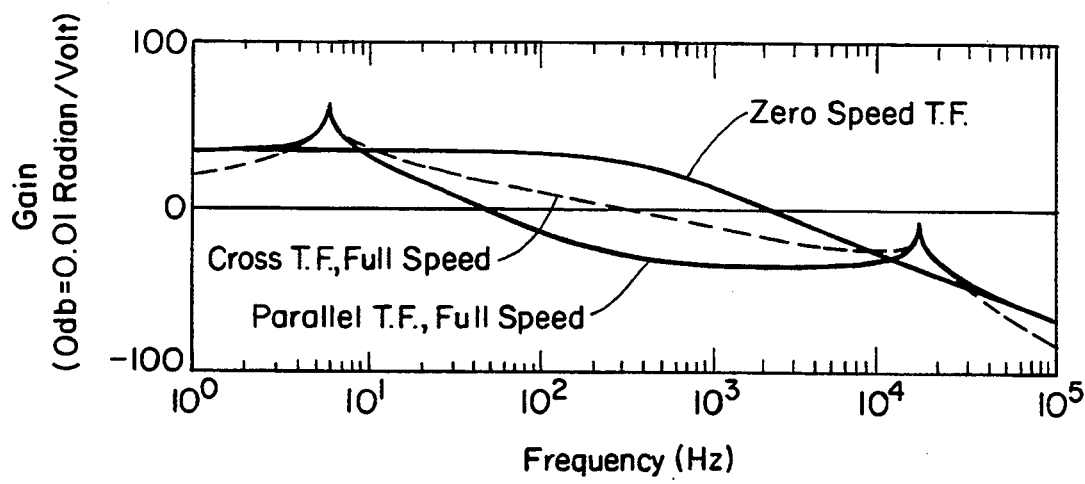
FIGS. 7A and 7B is a Bode plot of the plant transfer functions for the zero speed and full speed cases of the gyroscope of FIG. 1.
Figure 7B:
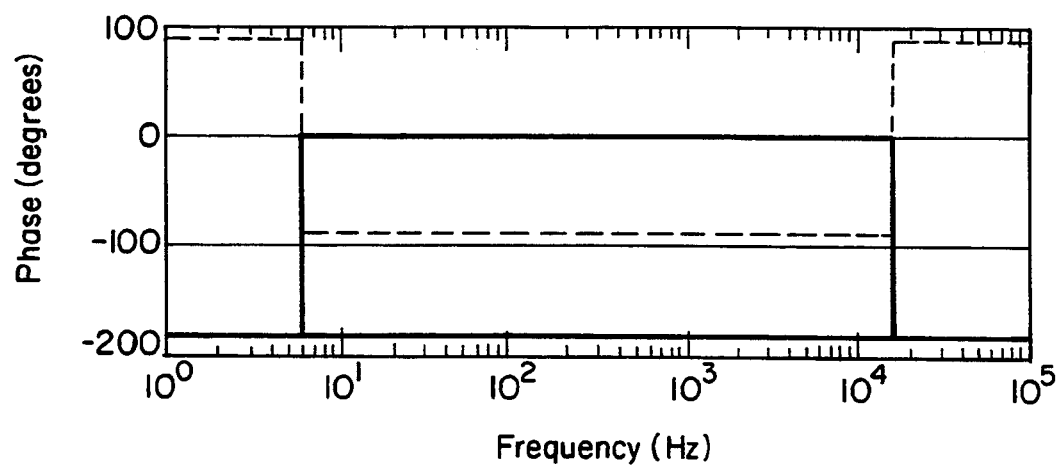

A Bode plot of the controller transfer functions are shown in FIGS. 7A and 7B. At zero speed, the device is a two degree of freedom unstable pendulum. Since the off diagonal or cross coupling transfer functions (X voltage to Y orientation, Y voltage to X orientation) are zero at zero speed, and the diagonal transfer functions are identical, there is only one transfer function. At frequencies above the 300 hertz unstable frequency, the transfer function falls off with a slope of −2, caused by the double integration of torque to angle, and scaled by the voltage to torque constant and the radial moment of inertia of the rotor.

At full speed of 500,000 rpm or 8.333 kilohertz, the plant dynamics are dominated by gyroscopic effects. Because of the X-Y symmetry, the two diagonal or parallel transfer functions (X voltage to X orientation and Y voltage to Y orientation) are the same. Similarly, the two off-diagonal or cross-coupling transfer functions (X voltage to Y orientation and Y voltage to X orientation) are also the same. The plane is completely characterized by two transfer functions, parallel (diagonal) and cross (off-diagonal) transfer functions.

As can be seen from the plot, there are two sets of undamped eigenvalues, one at approximately 16 kilohertz and the other at approximately 6 hertz. These are both forward whirl modes. The higher frequency whirl mode, (or fast precession mode), is located at the frequency given by the ratio of axial to radial moments of inertia times the rotational speed. At full speed, this open-looped fast precision frequency is 15.8 kilohertz. The lower frequency whirl mode, or "slow precession mode", is located at the frequency given by the unstable frequency squared divided by the fast precession frequency. At full speed, this open-loop slow precession frequency is 5.7 hertz. The actual control algorithm may be realized in a multitude of ways. The controller must, however, allow the stable control and estimation of external inputs over the full speed range of the gyroscope rotor.

Figure 8:
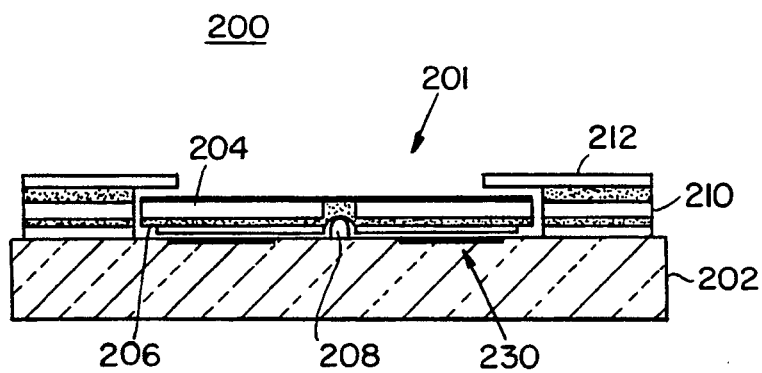
FIG. 8 is a view similar to that of FIG. 1 for an alternative gyroscope design according to this invention.
Figure 9:
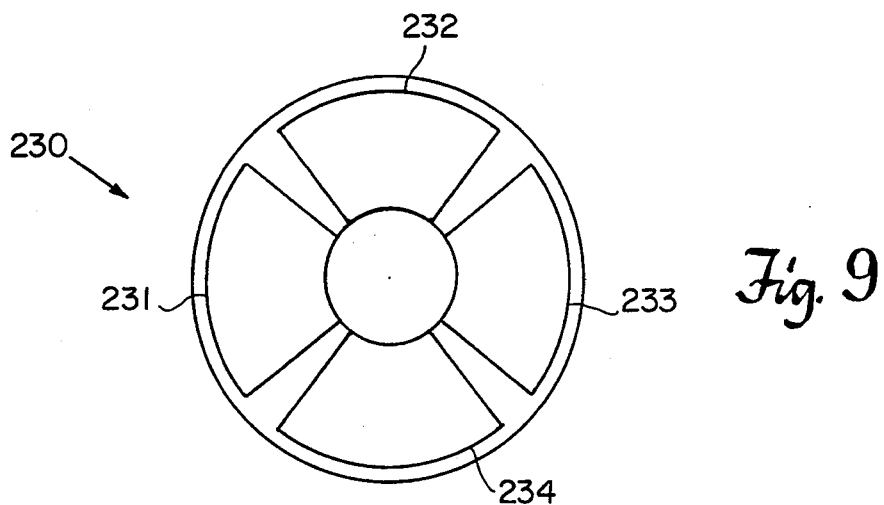
FIG. 9 is top view of the layer of the gyroscope of FIG. 8 having the rotor position sensing and control electrodes.

An alternative physical gyroscope design is shown in FIGS. 8 and 9. This gyroscope is also fabricated on a silicon chip using standard semiconductor micromachining techniques. Gyroscope 200 includes rotor 201 riding on central bushing 208 and including motor rotor 204 separated by insulating layer 206 from the lower portion of rotor 201 that interacts with control and sense electrodes in layer 230 within wafer 202, shown in more detail in FIG. 9 to include four circumferentially spaced sector sense/control electrodes 231-234. Bushing 208 constrains rotor 201 in three degrees of freedom, leaving only two tilt angles to be controlled and sensed by the four electrodes 231-234 in the manner described above. The output of this embodiment is thus limited to two angular rates.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. An electrostatically-controlled micromechanical gyroscope, comprising:
 a disc-shaped rotor;
 a rotor cavity encompassing said rotor;
 means for electrostatically spinning said rotor within said rotor cavity;
 a plurality of axial electrostatic rotor actuators above and below said rotor for providing exclusive control of the axial and tilt position of said rotor within said rotor cavity;
 a plurality of radial electrostatic actuators spaced circumferentially around said rotor for providing exclusive control of the radial and tilt position of said rotor within said rotor cavity; and
 means for resolving the position of said rotor within said cavity to determine the external forces acting on said rotor.

2. The electrostatically controlled micromechanical gyroscope of claim 1 in which said means for electrostatically spinning said rotor includes an electrostatic motor.

3. The electrostatically controlled micromechanical gyroscope of claim 2 in which said motor is synchronous.

4. The electrostatically controlled micromechanical gyroscope of claim 2 in which said motor includes a motor rotor member in said rotor.

5. The electrostatically controlled micromechanical gyroscope of claim 4 in which said motor further includes a motor stator member surrounding said rotor member around the periphery of said cavity.

6. The electrostatically controlled micromechanical gyroscope of claim 1 in which said plurality of axial electrostatic rotor actuators includes four actuators below said rotor and four actuators above said rotor.

7. The electrostatically controlled micromechanical gyroscope of claim 1 in which said plurality of radial electrostatic actuators includes a plurality of actuators spaced around the periphery of said cavity at two axially-spaced locations.

8. The electrostatically controlled micromechanical gyroscope of claim 7 in which there are four spaced radial actuators at each of said two axially-spaced locations.

9. The electrostatically controlled micromechanical gyroscope of claim 1 in which said means for resolving the position of said rotor within said cavity is responsive to said axial and said radial actuators.

10. The electrostatically controlled micromechanical gyroscope of claim 1 in which said means for resolving the position of said rotor within said cavity includes means for determining said rotor position in six degrees of freedom relative to said rotor cavity.

11. The electrostatically controlled micromechanical gyroscope of claim 1 further including means for controlling the position of said rotor within said cavity.

12. The electrostatically controlled micromechanical gyroscope of claim 11 in which said means for controlling the position of said rotor within said cavity is responsive to said axial and said radial actuators.

13. The electrostatically controlled micromechanical gyroscope of claim 12 in which said means for controlling the position of said rotor within said cavity includes means for selectively applying electrostatic rotor positioning signals to said axial and said radial actuators.

14. The electrostatically controlled micromechanical gyroscope of claim 1 in which said means for controlling the position of said rotor within said cavity includes means for altering in six degrees of freedom said rotor in relation to said cavity.

15. The electrostatically controlled micromechanical gyroscope of claim 1 in which said means for resolving the position of said rotor within said cavity includes a plurality of capacitive sensor means spaced around said rotor cavity.

16. The electrostatically controlled micromechanical gyroscope of claim 1 in which said gyroscope is integrated.

17. An integrated, electrostatically-controlled micromechanical gyroscope, comprising:
   an integrated mechanical gyroscope system including:
   a disc-shaped rotor;
   a rotor cavity encompassing said rotor;
   means for electrostatically spinning said rotor within said rotor cavity;
   a plurality of electrostatic rotor-positioning actuators spaced around the inside of said cavity for providing exclusive control of the position of said rotor within said cavity; and
   means for resolving the position of said rotor within said cavity to determine the external forces acting on said rotor.

18. The integrated electrostatically controlled micromechanical gyroscope of claim 17 in which said means for resolving the position of said rotor within said cavity includes a plurality of capacitive position sensors in said integrated mechanical gyroscope system.

19. The integrated, electrostatically controlled micromechanical gyroscope of claim 18 in which at least one of said capacitive position sensors includes a said electrostatic rotor-positioning actuator.

* * * * *